(12) United States Patent
Suzuki

(10) Patent No.: US 8,377,584 B2
(45) Date of Patent: Feb. 19, 2013

(54) SECONDARY BATTERY MODULE

(75) Inventor: Hiroyasu Suzuki, Nagoya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 535 days.

(21) Appl. No.: 12/652,953

(22) Filed: Jan. 6, 2010

(65) Prior Publication Data

US 2010/0173189 A1   Jul. 8, 2010

(30) Foreign Application Priority Data

Jan. 7, 2009   (JP) .................................. 2009-001503

(51) Int. Cl.
  *H01M 2/26* (2006.01)
(52) U.S. Cl. ........ 429/158; 429/121; 429/138; 429/148; 429/153; 429/154; 429/160; 429/161; 429/163; 429/175
(58) Field of Classification Search .................... 429/90, 429/121, 138, 148, 149, 153–154, 158–163, 429/175–176
  See application file for complete search history.

(56) References Cited

U.S. PATENT DOCUMENTS

| 3,397,089 A * | 8/1968 | Ryusuke Sasagawa et al. | 429/160 |
| 2009/0111007 A1 * | 4/2009 | Naganuma | 429/82 |

FOREIGN PATENT DOCUMENTS

| GB | 2 042 249 A | 9/1980 |
| JP | 55-046274 A | 3/1980 |
| JP | 5-193366 A | 8/1993 |
| JP | 6-223803 A | 8/1994 |
| JP | 9-7564 A | 1/1997 |
| JP | 11-111253 A | 4/1999 |
| JP | 2002-246074 A | 8/2002 |
| JP | 2005-322647 A | 11/2005 |
| WO | WO 86/04186 A1 | 7/1986 |
| WO | WO 2008/050721 A1 | 5/2008 |

OTHER PUBLICATIONS

Eurpean Search Report issued in European Patent Application No. 09179307.5 on Oct. 10, 2011.

* cited by examiner

*Primary Examiner* — Patrick Ryan
*Assistant Examiner* — Ben Lewis
(74) *Attorney, Agent, or Firm* — Birch, Stewart, Kolasch & Birch, LLP

(57) ABSTRACT

A secondary battery module includes a row of cells arranged with a gap therebetween, a lid covering one side of the cell row, inner ribs formed on the inner surface of the lid and each determining the gap between the adjacent cells, an outer rim extending along the outer periphery of the lid and cooperating with the corresponding inner ribs to hold the cells located at the opposite ends of the cell row, and a plurality of busbars used to electrically connect the cells in series. The cells and the lid are mechanically connected together by means of the busbars.

8 Claims, 3 Drawing Sheets

SECONDARY BATTERY MODULE

BACKGROUND OF THE INVENTION

1. Field of the Invention

The present invention relates to a secondary battery module including a plurality of secondary cells.

2. Description of the Related Art

A lithium-ion cell has been known as a type of secondary cells and is used in the form of a battery pack, for example, to be mounted on an electric vehicle. Specifically, this type of battery pack has a cell row incorporated therein, and the cell row includes a plurality of cells.

The cell row weighs considerably, and therefore, each of the cells or the cell row as a whole needs to be securely fixed in position.

Also, especially in the case of the battery module of a battery pack mounted on an electric vehicle, not only vibrations produced during the travel of the electric vehicle but also heat radiated from the individual cells need to be taken into consideration. Thus, in the battery module, a space is provided between the adjacent cells. The individual cells are cooled by the air flowing through the spaces, so that the cells are prevented from being overheated. Also, even if a cell swells due to rise in the output voltage, the space serves to prevent the cell from contacting with its adjacent cell.

Where the cells are so arranged as to leave a space between the adjacent cells, it is necessary that the individual cells should be immovably held inside the battery module. To this end, the battery module disclosed in Patent Document 1 identified below has upper and lower members. The lower member has a plurality of chambers for accommodating the respective cells independently of one another, and the upper member has a plurality of push portions for pressing the cells accommodated in the chambers.

Patent Document 1: Japanese Laid-open Patent Publication No. H05-193366

In the battery module of Patent Document 1, however, the cells are merely pressed by the push portions of the upper member, and therefore, when the battery module is vibrated or applied with external force, the cells move inside the chambers.

The electrode terminals of every two adjacent cells are electrically connected by a busbar. If the cells move as stated above, undesirable tension acts upon the busbars due to the movement of the cells, possibly causing damage to the busbars or to the electrode terminals.

Meanwhile, if the output voltage of a lithium-ion cell rises above its allowable upper-limit value or drops below its allowable lower-limit value, the cell possibly deteriorates or fails to operate properly. Accordingly, it is desirable that this type of battery module should be provided with a monitoring device for monitoring the output voltage of the cell. Such monitoring device includes, for example, a printed wiring board and an arithmetic processing unit mounted on the wiring board. The arithmetic processing unit is electrically connected with the positive and negative electrode terminals of the individual cells to be input with the output voltages of the respective cells. Specifically, the positive and negative electrode terminals are electrically connected through respective monitoring terminals to the wiring of the printed wiring board.

If the cells move as stated above, however, the monitoring terminals and the wiring board are also applied with tension, and such tension causes damage to the monitoring terminals or the wiring board, that is, failure of the connection between the individual terminals and the arithmetic processing unit.

An object of the present invention is therefore to provide a secondary battery module which is capable of securely holding secondary cells with a fixed gap provided between adjacent cells and thereby preventing damage to positive and negative electrode terminals, busbars, monitoring terminals and the like.

SUMMARY OF THE INVENTION

The above object is achieved by a secondary battery module according to the present invention, the secondary battery module comprising: a cell row including a plurality of secondary cells arranged in one direction with a gap therebetween, each of the secondary cells having a terminal surface and positive and negative electrode terminals protruding from the terminal surface, adjacent ones of the secondary cells being arranged such that the positive electrode terminal of one of the adjacent secondary cells and the negative electrode terminal of the other of the adjacent secondary cells are located on an identical side of the cell row; a cover member covering a side of the cell row corresponding to the terminal surfaces of the secondary cells, the cover member having a plurality of inner ribs each interposed between the adjacent secondary cells and determining the gap between the adjacent secondary cells, and an outer rib cooperating with corresponding ones of the inner ribs to hold two of the secondary cells located at opposite ends of the cell row; a plurality of busbars each electrically connecting the positive electrode terminal of one of the adjacent secondary cells and the negative electrode terminal of the other of the adjacent secondary cells to each other; and a fastening device fastening the cover member and the secondary cells together by means of the busbars.

When the cell row is covered with the cover member, the inner ribs are held between the corresponding cells and each serve as a partition wall determining the gap between the adjacent cells. The two cells located at the opposite ends of the cell row are each held between the corresponding inner rib and the outer rib.

Accordingly, the individual cells of the cell row are fixed to the cover member in a state such that a fixed gap is left between the adjacent cells, and the upper surfaces of the individual cells are located in the same plane determined by the inner surface of the cover member.

As a result, the secondary battery module can securely hold the secondary cells with the fixed gap provided between the adjacent cells, so that the busbars are not applied with any tension attributable to movement of the secondary cells, thus reliably preventing damage to the busbars.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirits and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Figure 1:
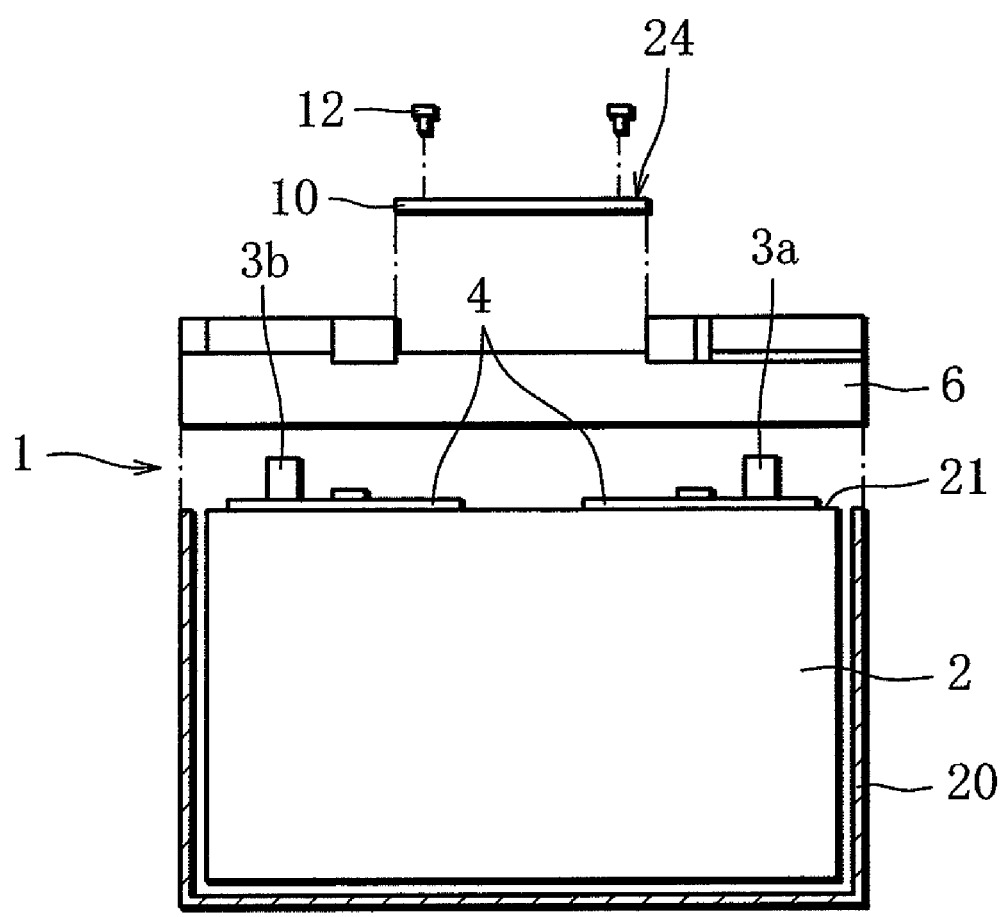
FIG. 1 is an exploded side view of a battery module according to one embodiment of the invention.

A battery module 1 according to one embodiment of the invention includes, for example, four lithium-ion cells (hereinafter merely referred to as cells) 2. The cells 2 are arranged in one direction to constitute a cell row 22, and a predetermined gap is provided between adjacent ones of the cells 2. Each cell 2 includes positive electrodes, negative electrodes and separators, each in the form of a thin film. The positive and negative electrodes are alternately laid one upon the other with the separator therebetween to form what is called an electrode stack. The cell 2 further includes a cell case accommodating the electrode stack, and an outer case containing the cell case together with an electrolyte and hermetically sealing the contents therein. The cell case is made of synthetic resin having electrical and thermal insulating properties, while the outer case is made of metal.

The cell 2 will be described in more detail. Each cell 2 is in the form of a rectangular parallelepiped and has a longitudinal axis extending in a direction perpendicular to the cell row 22. The cell 2 has an upper surface 21 and also has positive and negative electrode terminals 3a and 3b located on opposite sides of the upper surface 21. The positive and negative electrode terminals 3a and 3b are connected to the positive and negative electrodes, respectively, of the electrode stack. As clearly shown in FIG. 1, the positive and negative electrode terminals 3a and 3b both protrude from the upper surface 21 of the cell 2.

Figure 2:
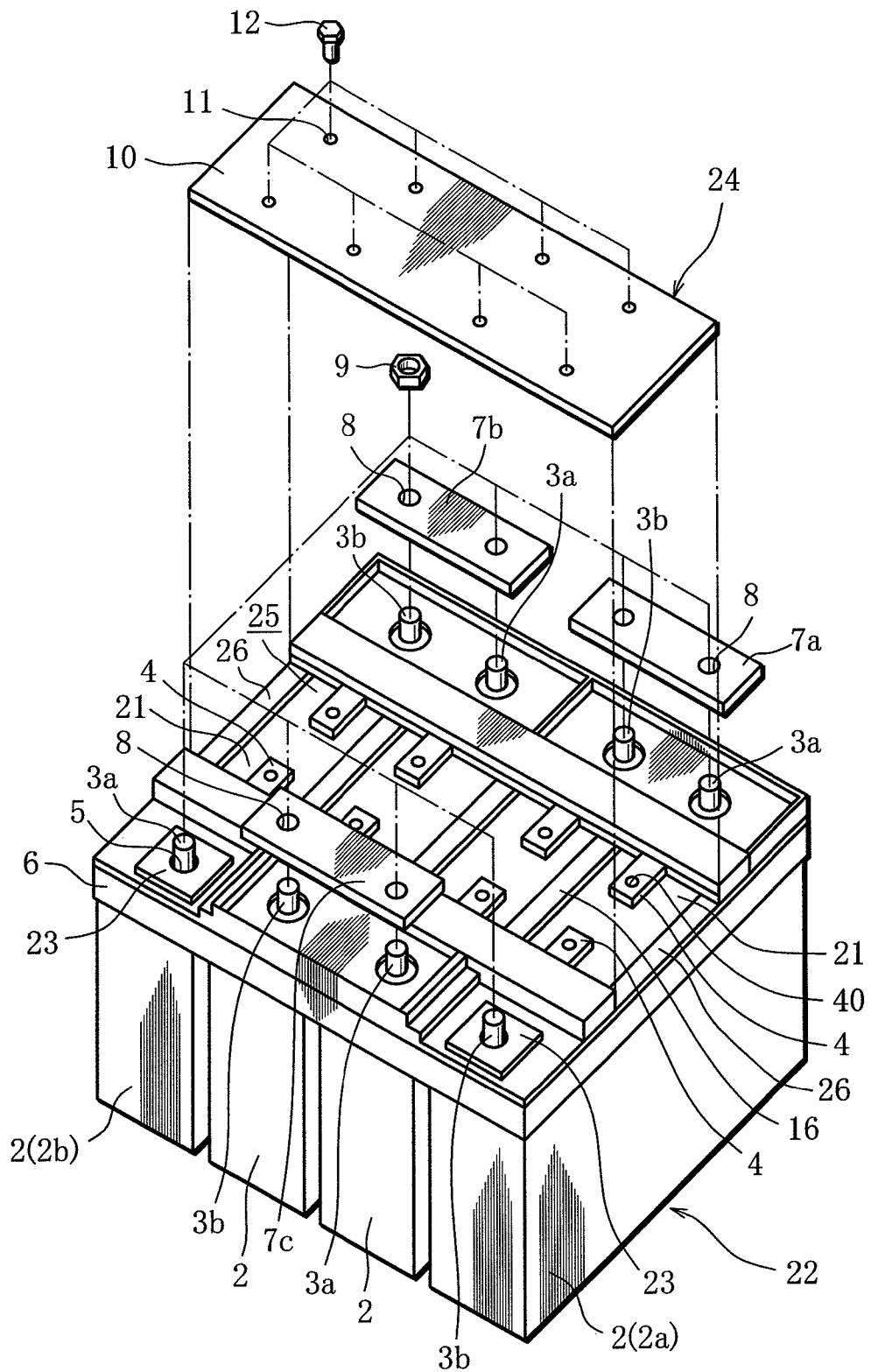
FIG. 2 is a perspective view of the battery module of FIG. 1.

Also, as is clear from FIGS. 1 and 2, the battery module 1 includes a rectangular lid 6. The lid 6 is made of synthetic resin and capable of covering the upside of the cell row 22 despite the presence of the positive and negative electrode terminals 3a and 3b. Specifically, a plurality of holes 5 are formed through outer edge portions of the lid 6, and when the cell row 22 is covered with the lid 6, the positive and negative electrode terminals 3a and 3b of each cell 2 project through the corresponding holes 5 upward from the lid 6.

Among the cells 2 forming the cell row 22, the adjacent cells 2 are arranged such that the positions of the positive and negative electrode terminals 3a and 3b are reversed, thus allowing the cells 2 to be electrically connected in series. Specifically, busbars 7a, 7b and 7c are placed on the upper surface of the lid 6, and the busbars 7a and 7b are located on one side of the upper surface of the lid 6 with respect to the axis of the cell row 22. The busbar 7a connects the positive electrode terminal 3a of the cell 2a located at one end of the cell row 22 and the negative electrode terminal 3b of the cell 2 adjacent to the cell 2a, and the busbar 7b connects the negative electrode terminal 3b of the cell 2b located at the other end of the cell row 22 and the positive electrode terminal 3a of the cell 2 adjacent to the cell 2b. The busbar 7c is located on the other side of the upper surface of the lid 6 with respect to the axis of the cell row 22 and connects the positive and negative electrode terminals 3a and 3b of the respective two cells 2 located in the middle of the cell row 22. Consequently, the cells 2 of the cell row 22 are electrically connected in series.

The manner of how the electrode terminals 3 are connected to the busbars 7 will be now described in detail. An upper end portion of each of the positive and negative electrode terminals 3a and 3b has a screw thread formed thereon, and the busbars 7a, 7b and 7c each have a pair of tapped holes 8 formed therein. The busbars 7 are placed on the upper surface of the lid 6 with the electrode terminals 3 inserted through the corresponding tapped holes 8. Then, nuts 9 are screwed onto the respective electrode terminals 3 projecting from the busbars 7, so that the cell row 22, the lid 6 and the busbars 7 are fastened together by the nuts 9 and the electrode terminals 3 with the lid 6 held between the cell row 22 and the busbars 7.

As for the negative electrode terminal 3b of the cell 2a and the positive electrode terminal 3a of the cell 2b, the nut 9 is screwed onto the corresponding electrode terminal with a washer 23 interposed therebetween, so that the lid 6 and the individual cells 2a and 2b are fastened together by the nuts 9 and the washers 23. Accordingly, the individual cells 2 of the cell row 22 are brought into close contact with the inner surface of the lid 6, and the upper surfaces 21 of the cells 2 are located in the same plane.

The electrode terminals 3a and 3b and the busbars 7 may alternatively be fastened together by spot welding, brazing such as soldering, swaging or using contacting pins, instead of using the nuts 9.

Further, as shown in FIG. 1, the cell row 22 of the battery module 1 is accommodated in a module case 20. The module case 20 is made of synthetic resin and has an opening at its top. When the cell row 22 is contained in the module case 20, the lid 6 closes the opening of the module case 20. A large number of vent holes (not shown) are formed in the side walls of the module case 20 and permit air to be introduced into and discharged from the battery module 1. The battery module 1 and the module case 20 constitute what is called a battery pack.

Two additional modules (not shown) may be arranged adjacent to the respective opposite ends of the battery module 1. Each additional module, which is similar to the battery module 1, includes a cell row aligned with the cell row 22 and is electrically connected in series with the battery module 1. Specifically, an end cell of one of the additional modules is arranged adjacent to the cell 2a of the battery module 1, and the positive electrode terminal of the end cell and the negative electrode terminal 3b of the cell 2a are connected to each other by a busbar. Similarly, an end cell of the other additional module is arranged adjacent to the cell 2b of the battery module 1, and the negative electrode terminal of the end cell and the positive electrode terminal 3a of the cell 2b are connected to each other by a busbar. In this case, the battery pack has the multiple battery modules contained in the module case.

Meanwhile, the lithium-ion cell 2 has the advantage that the internal energy density thereof can be elevated. If the output voltage of the cell 2 rises above or drops below its allowable upper or lower limit, however, deterioration of the cell 2 is accelerated, as stated above, possibly causing a situation where the cell 2 ceases to operate properly earlier than expected. Thus, to prevent deterioration and failure of the cell 2, the output voltage of the cell 2 needs to be monitored. To this end, the battery module 1 is provided with a monitoring device for monitoring the output voltages of the individual cells 2.

Specifically, the monitoring device 24 includes monitoring terminals 4 associated with the respective positive and negative electrode terminals 3a and 3b of the cells 2 and positioned on the upper surfaces 21 of the corresponding cells 2. Each monitoring terminal 4 is electrically connected to the corresponding electrode terminal 3 and extends toward the axis of the cell row 22. Namely, the monitoring terminals 4 extending from the positive and negative electrode terminals 3a and 3b of each cell 2 have distal end portions located on opposite sides of the axis of the cell row 22, and a tapped hole 40 is formed in the distal end portion of each monitoring terminal 4.

As is clear from FIG. 2, the lid 6 has an opening 25 formed in the center thereof, and the opening 25 extends along the axis of the cell row 22 such that the distal end portions of all monitoring terminals 4 are exposed through the opening 25 of the lid 6.

The monitoring device 24 further includes a rectangular printed wiring board 10, and an arithmetic processing unit (not shown) for monitoring the output voltages is mounted on the upper surface of the wiring board 10. The wiring board 10 extends in the axial direction of the cell row 22 and has a size large enough to cover the opening 25 of the lid 6. A plurality of through holes 11 are formed in both side edge portions of the wiring board 10 and electrically connected to the arithmetic processing unit via a printed wiring (not shown) of the wiring board 10.

Also, the through holes 11 are formed so as to correspond in position to the respective tapped holes 40 of the monitoring terminals 4. When the wiring board 10 is placed on the lid 6 to close the opening 25, the through holes 11 are located in alignment with the corresponding tapped holes 40. With the wiring board 10 positioned in this manner, bolts 12 are screwed into the respective tapped holes 40 through the through holes 11 of the wiring board 10, whereupon the bolts 12 electrically connect the arithmetic processing unit on the wiring board 10 and the monitoring terminals 4 to each other via the printed wiring and also mechanically connect the wiring board 10 and the cell row 22 to each other.

Accordingly, the arithmetic processing unit is input with the output voltages from the respective monitoring terminals 4 and thus can monitor the output voltages of the individual cells 2.

The electrical connection between the arithmetic processing unit and the monitoring terminals 4 will be explained in more detail. The cells 2 forming the cell row 22 are electrically connected in series as stated above, and therefore, the two monitoring terminals 4 associated with the positive and negative electrode terminals 3a and 3b connected to each other by the same busbar 7 have an equal potential. Thus, only one of each pair of monitoring terminals 4 may be electrically connected to the corresponding through hole 11 of the wiring board 10 by the bolt 12. In this case, the number of the monitoring terminals 4 electrically connected to the arithmetic processing unit can be cut down.

Figure 3:
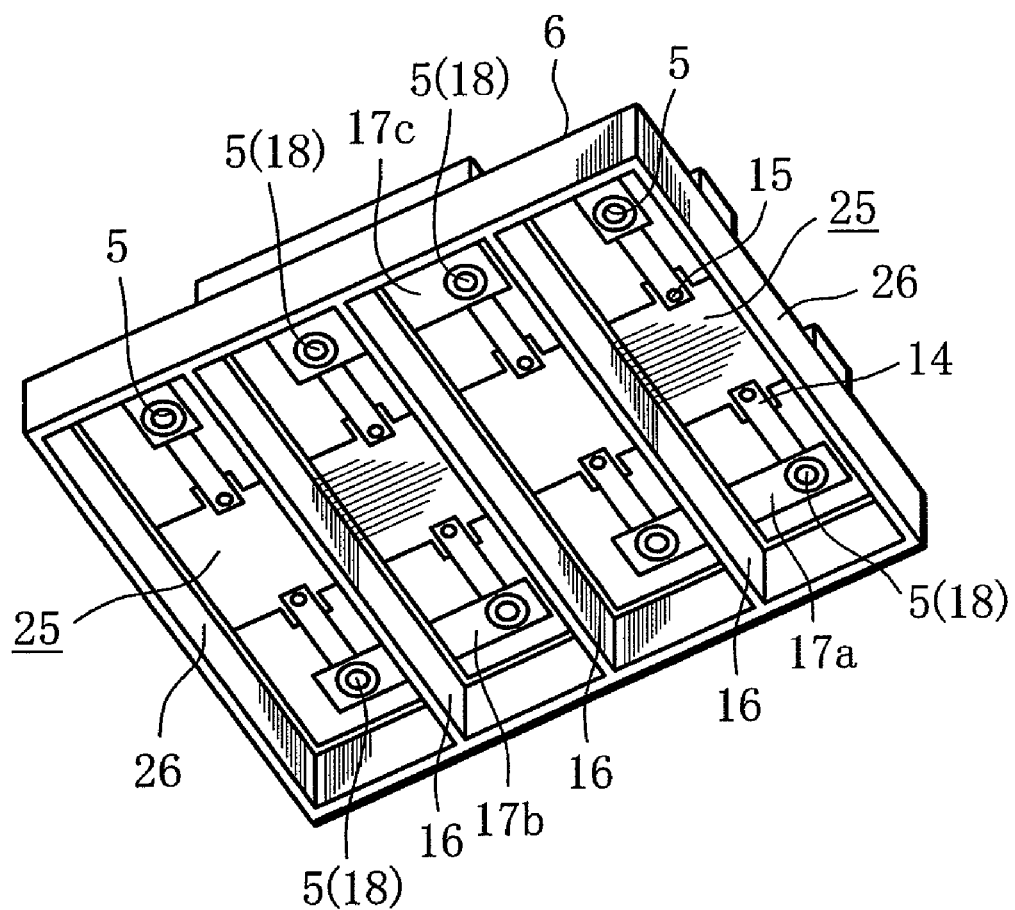
FIG. 3 is a perspective view showing the inner side of a lid appearing in FIG. 1.

FIG. 3 illustrates the inner side of the lid 6.

The lid 6 has a rectangular outer rim 26 extending along an outer peripheral edge thereof and three inner ribs 16. When the opening of the module case 20 is closed with the lid 6, the outer rim 26 surrounds the upside of the cell row 22 and also coincides with the opening edge of the opening in the module case 20. On the other hand, the three inner ribs 16 protrude from the inner surface of the lid 6. Specifically, the inner ribs 16 are set apart from each other at predetermined intervals along the cell row 22 and extend in such a direction as to cross the cell row 22. When the cell row 22 and the lid 6 are fastened together in the aforementioned manner, each inner rib 16 fits in between the corresponding cells 2 and serves as a partition wall determining the gap between the cells 2. The two cells 2 located at the opposite ends of the cell row 22 are each held between the outer rim 26 and the corresponding inner rib 16, and thus the outer rim 26 forms two outer ribs cooperating with the inner ribs 16 associated therewith.

Consequently, the individual cells 2 of the cell row 22 are fixed to the lid 6 in a state such that a fixed gap is secured between the adjacent cells 2 and also that the upper surfaces 21 of the individual cells 2 are located in an identical plane determined by the inner surface of the lid 6.

When the battery pack is constructed with the cell row 22 of the battery module 1 accommodated in the module case 20, therefore, the cell row 22 is held between the lid 6 and the bottom of the module case 20 and at the same time each cell 2 of the cell row 22 is held between the inner ribs 16 or between the inner rib 16 and the outer rim 26. Namely, at the point of time when the cell row 22 is contained in the module case 20, the individual cells 2 are positioned both in the depth direction of the module case 20 and in the width direction of the module case 20 along the cell row 22 at the same time.

As a result, the individual cells 2 of the cell row 22 do not move independently inside the module case 20 in the depth direction or the width direction of the module case 20, and accordingly, the busbars 7 are not applied with any tension attributable to the movement of the cells 2, making it possible to reliably prevent damage to the busbars 7.

The wiring board 10 is connected to the cell row 22 by the monitoring terminals 4, and therefore, the positioning of the wiring board 10 is completed as soon as the cell row 22 is positioned.

Also, since the cells 2 are not allowed to move independently of each other, no tension acts upon the monitoring terminals 4 or the wiring board 10. As a consequence, damage to the monitoring terminals 4 or to the wiring board 10 and also failure in the electrical connection between the individual monitoring terminals 4 and the wiring board 10 can be reliably prevented, permitting the output voltages of the individual cells 2 to be reliably input to the arithmetic processing unit on the wiring board 10.

A modification of the battery module 1 will be now described with reference to FIG. 3.

The lid 6 of the modification includes busbars 17a, 17b and 17c similar in function to the aforementioned busbars 7a, 7b and 7c. The busbars 17 are attached to the inner surface of the lid 6, and holes 18 corresponding in position to the respective holes 5 are formed in the opposite end portions of each busbar 17.

Further, terminal bars 14 similar in function to the aforementioned monitoring terminals 4 are arranged on the inner surface of the lid 6. Each terminal bar 14 has an end which is electrically connectable to the corresponding electrode terminal 3 to be inserted through the holes 5 and 18 or is electrically connected to the corresponding busbar 17, and extends toward the opening 25 of the lid 6. Also, each terminal bar 14 has a tapped hole 15 formed in a distal end portion thereof and corresponding to the hole 40 of the monitoring terminal 4.

In the case of the modification, the wiring board 10 is mechanically connected to the lid 6 by the bolts 12 and the terminal bars 14, and the printed wiring of the wiring board 10, that is, the arithmetic processing unit, is electrically connected to the electrode terminals 3 via the bolts 12 and the terminal bars 14.

Since, in the modification, the busbars 17 and the terminal bars 14 are attached to the lid 6, the busbars 17 and the terminal bars 14 can be easily positioned with accuracy. Thus, when the lid 6 is attached to the cell row 22, the tension acting on the busbars 17 or the terminal bars 14 and on the wiring board 10 can be more reliably reduced, preventing damage to these elements. It is also possible to reliably prevent failure in the connection between the individual terminal bars 14 and the printed wiring of the wiring board 10, whereby the output voltages of the individual cells 2 can be reliably input to the arithmetic processing unit.

The present invention is not limited to the embodiment and modification explained above.

For example, the battery module may accommodate a different type of secondary cells than the lithium-ion cells.

Also, each cell may have a different type of internal construction than the electrode stack.

Further, the cell row of the battery module may include a desired number of cells.

What is claimed is:

1. A secondary battery module comprising:
   a cell row including a plurality of secondary cells arranged in one direction with a gap therebetween, each of the secondary cells having a terminal surface, and positive and negative electrode terminals protruding from the terminal surface, adjacent ones of the secondary cells being arranged such that the positive electrode terminal of one of the adjacent secondary cells and the negative electrode terminal of the other of the adjacent secondary cells are located on an identical side of the cell row;
   a cover member covering a side of the cell row corresponding to terminal surfaces of the secondary cells, the cover member having a plurality of inner ribs each interposed between the adjacent secondary cells and determining the gap between the adjacent secondary cells, and an outer rib cooperating with corresponding ones of the inner ribs to hold two of the secondary cells located at opposite ends of the cell row;
   a plurality of busbars each electrically connecting the positive electrode terminal of one of the adjacent secondary cells and the negative electrode terminal of the other of the adjacent secondary cells to each other; and
   a fastening device fastening the cover member and the secondary cells together by means of the busbars,
   wherein the fastening device includes:
   a plurality of penetration holes formed through the cover member and allowing the positive and negative electrode terminals of the secondary cells to pass therethrough;
   two connection holes formed through each of the busbars and allowing corresponding ones of the positive and negative electrode terminals to pass therethrough, the two connection holes of each of the busbars permitting the corresponding positive and negative electrode terminals to be electrically connected to the busbar; and
   joining means joining each of the busbars to the corresponding positive and negative electrode terminals passed through the penetration holes and the connection holes.

2. The secondary battery module according to claim 1, wherein the busbars are arranged on one of inner and outer surfaces of the cover member.

3. The secondary battery module according to claim 2, further comprising:
   a monitoring device for monitoring output voltages of the individual secondary cells.

4. The secondary battery module according to claim 3, wherein the monitoring device includes:
   an opening formed at a center of the cover member and allowing the terminal surfaces of the secondary cells to be exposed;
   a printed wiring board so arranged as to close the opening; and
   an electrical connection path electrically connecting the printed wiring board and the individual secondary cells to each other.

5. The secondary battery module according to claim 4, wherein the electrical connection path includes:
   a monitoring terminal arranged on the terminal surface of each of the secondary cells and extending from a corresponding one of the positive and negative electrode terminals toward the opening of the cover member, the monitoring terminal having a distal end portion exposed through the opening; and
   connection means configured to mechanically and electrically connect the distal end portion of the monitoring terminal and the printed wiring board to each other.

6. The secondary battery module according to claim 5, wherein the connection means includes:
   a tapped hole formed through the distal end portion of the monitoring terminal;
   a through hole formed through the printed wiring board and capable of coinciding with the tapped hole; and
   a bolt screwed into the tapped hole through the through hole of the printed wiring board.

7. The secondary battery module according to claim 4, wherein the electrical connection path includes:
   a terminal bar arranged on the inner surface of the cover member and extending from a corresponding one of the through holes of the cover member toward the opening, the terminal bar having a distal end portion exposed through the opening and allowed to be electrically connected to the positive or negative electrode terminal passed through the corresponding through hole; and
   connection means configured to mechanically and electrically connect the distal end portion of the terminal bar and the printed wiring board to each other.

8. The secondary battery module according to claim 7, wherein the connection means includes:
   a tapped hole formed through the distal end portion of the terminal bar;
   a through hole formed through the printed wiring board and capable of coinciding with the tapped hole; and
   a bolt screwed into the tapped hole through the through hole of the printed wiring board.

\* \* \* \* \*